May 26, 1925.
J. H. WALKER, JR
1,539,789
SPRAYING APPARATUS
Filed July 1, 1922   2 Sheets-Sheet 1
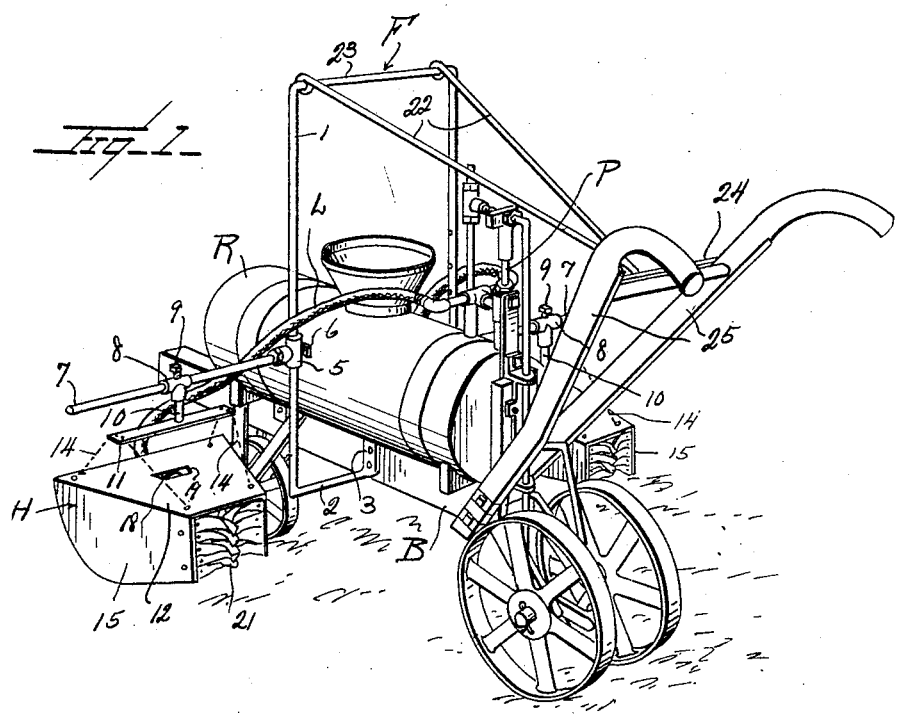
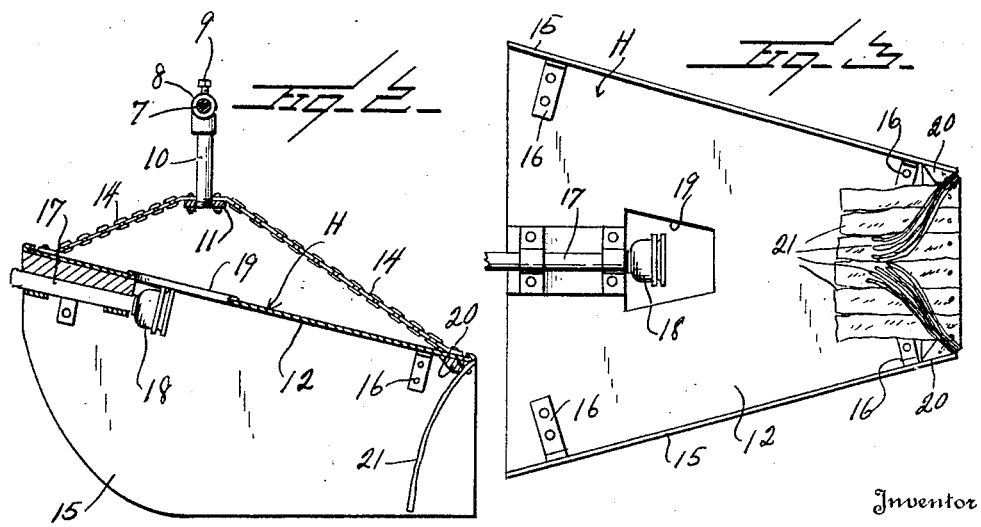
Inventor
J. H. Walker, Jr.
By Watson E. Coleman
Attorney

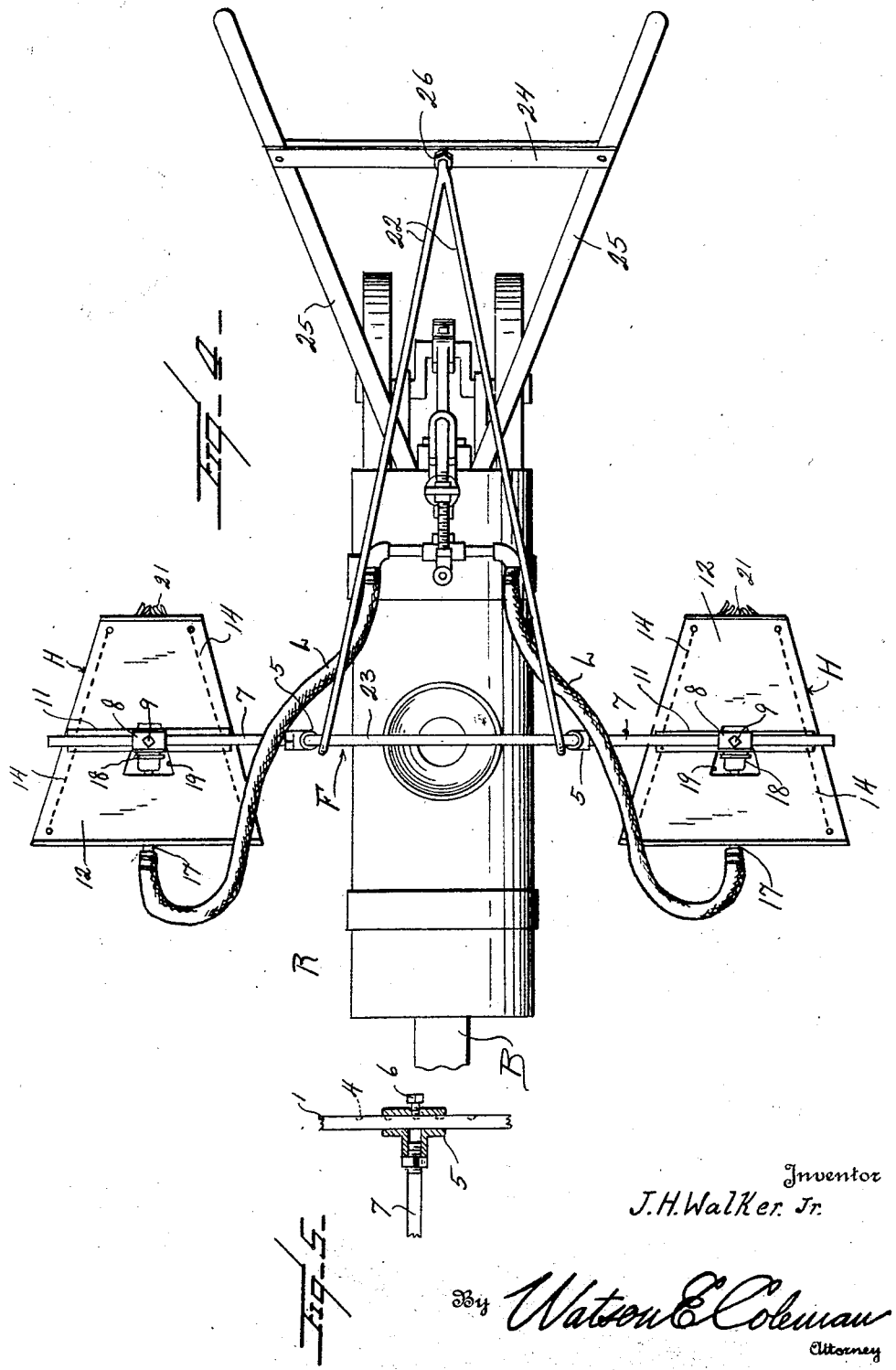

Patented May 26, 1925.

1,539,789

UNITED STATES PATENT OFFICE.

JAMES H. WALKER, JR., OF GRIFFIN, GEORGIA.

SPRAYING APPARATUS.

Application filed July 1, 1922. Serial No. 572,202.

*To all whom it may concern:*

Be it known that JAMES H. WALKER, Jr., a citizen of the United States, residing at Griffin, in the county of Spalding and State of Georgia, has invented certain new and useful Improvements in Spraying Apparatus, of which the following is a specification, reference being had to the accompanying drawings.

This invention relates to certain improvements in spraying apparatus and it is an object of the invention to provide an apparatus of this general character having means of a novel and improved character whereby the plants or the like to be treated are effectively subjected to the spraying.

Another object of the invention is to provide a novel and improved device of this general character including a hood adapted to travel over the plants or the like to be treated together with a spraying medium carried by said hood for treating the plants.

An additional object of the invention is to provide an apparatus of this general character comprising a novel and improved hood adapted to travel over a plant or the like to be treated and wherein said hood is provided with means, such as a swabbing medium, to treat the surfaces of the foliage of the plant.

Furthermore, it is an object of the invention to provide a novel and improved apparatus of this general character which is especially designed and adapted for use in connection with cotton plants and which comprises a hood adapted to travel over such plants to bend said plants into a position to effectively receive a solution of material discharged by a spraying medium carried by the hood.

It is a further object of the invention to provide a novel and improved device of this general character comprising a hood adapted to travel over a row of plants or the like and which is provided with a spraying element for treating such plants, said hood possessing a certain degree of flexibility so that the travel of the hood over and along a row of plants will not be unduly hindered by an abnormal obstruction with which said hood may be brought into contact.

The invention consists in the details of construction and in the combination and arrangement of the several parts of my improved spraying apparatus whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:

Figure 1 is a view in perspective of a spraying apparatus constructed in accordance with an embodiment of my invention;

Figure 2 is an enlarged vertical sectional view taken through one of the hoods comprised in my improved apparatus as herein disclosed with certain parts omitted;

Figure 3 is a view in bottom plan of the hood as illustrated in Figure 2;

Figure 4 is a view in top plan of the apparatus as herein embodied; and

Figure 5 is a fragmentary view partly in section and partly in elevation illustrating in detail a means for vertically adjusting a hood.

As disclosed in the accompanying drawings, B denotes a portable body provided with a receptacle or tank R from which a spraying medium is adapted to be discharged through the lines L under the influence of the force feed or pump P. The particular construction and operation of the foregoing form no particular part of my present invention as the same is described and claimed in another application for patent filed July 1, 1922, Ser. No. 572,201.

Supported by the body B at a desired point thereon is an upstanding supporting structure or frame F herein disclosed as substantially in the form of an inverted U with the lower extremity of each of the side arms 1 of such structure or frame terminating in an inwardly directed bottom 2 which is bolted or otherwise secured as at 3 to the body B. The inner face of each of the arms 1 is directed therealong with a series of notches or recesses 4, see Figure 5.

Slidably mounted upon each of the arms 1 of the structure or frame F is a sleeve or barrel 5, through the wall of which is threaded or otherwise directed a holding member 6 adapted to engage within a notch or recess 4 whereby the sleeve or barrel 5 may be held at desired points lengthwise of the associated arm 1.

Extending outwardly from the sleeve or barrel 5 and preferably perpendicularly related to the adjacent arm 1 is an elongated supporting member or rod 7. Slidably mounted upon the rod 7 is a sleeve or barrel 8 adapted to be held in locked position upon the rod 7 by the binding or clamping screw 9 carried by said sleeve or barrel. Depending from the sleeve or barrel 8 is a short arm 10 to the lower extremity or end portion of which is suitably secured an elongated head 11, said head 11 being disposed in the same general direction as the rod 7, the arm 10 being secured, preferably, at the longitudinal center of the elongated member or head 11.

The head or member 11 overlies a hood H which, in cross section, is substantially in the form of an inverted U. The hood H has its sides converging from its front end to its rear end and the corner portions of the top wall 12 of the hood, which is of relatively thin sheet metal, are flexibly connected by the chains 14 or the like with the opposite end portions of the elongated member or head 11. This flexible connection is of particular advantage as it permits the hood H during a working operation to have free movement in a vertical direction to compensate for any inequalities in the surface over which the same may be traversed.

The depending side walls 15 of each of the hoods H at their opposite end portions are reinforced by the angle irons 16 secured to said side walls 15 and top 12 but these irons 16 do not hinder or interfere with the inherent resiliency possessed by the top wall 12 of the hood so that in practice said top wall has unhampered flexure lengthwise thereof. This flexibility of the top wall 12 of each of the hoods H is of decided advantage as it permits the hood H, or more particularly a side wall 15 thereof, to readily pass over an abnormal obstruction such as a large stone or clod with which the same may come in contact so that possibility of the hood being thrown out of its desired path of travel is reduced to a minimum.

Supported by and underlying the forward portion of each of the hoods H and preferably at the transverse center thereof is the pipe section 17 to the forward end portion of which is coupled one of the lines L. The opposite end portion of the pipe section 17 has attached thereto a spray nozzle 18 of a whirling type so that a material discharged therefrom will be scattered or diffused to the greatest possible extent so that a plant over which the hood H passes will be effectively treated.

In practice it is to be understood that it is preferred that the side walls 15 of a hood H be of a height less than the height of the plants to be treated so that as the hood passes over such plants the same will be bent or thrown forward. This is of particular advantage in the treatment of cotton plants as the buds will be brought substantially directly in advance of the nozzle 18 while at the same time the entire plant will be thoroughly sprayed, not only by the direct streams from the nozzle 18 but by the streams deflected from the side walls 15.

In order that the operator may readily determine whether or not the nozzle 18 of the hood H is properly functioning I find it of advantage to provide the top wall 12 of the hood with a relatively large opening 19 directly above the nozzle 18 so that visual access may be had at all times.

Each of the side walls 15 of a hood H has its forward end portions arcuate or disposed on a predetermined curvature. This is to facilitate the travel of the hood and to prevent such hood injuring the plant as there are no sharp points or corners to cut or otherwise injure the plant.

The bending or throwing forward of the plants by the hood H is effected in view of the fact that the top wall 12 of the hood is disposed on a rearward and downward incline as is clearly indicated in Figure 2 of the accompanying drawings.

The rear marginal portions of the top 12 and the side walls 15 of each of the hoods are substantially defined by the cleats 20, the vertical or side cleats being omitted in Figure 2. Each of these cleats 20 has its rear marginal portion beveled and to which beveled portion or surface is secured the elongated strips or flaps 21 of absorbent material. These applied flaps 21 normally provide a closure for the rear end of a hood H and are saturated by the liquid discharge from the nozzle 18 and particularly by the discharge occurring between plants in a row. As a hood H passes over a plant the saturated flaps or strips 21 serve as swabs to apply the liquid to the under portion of the foliage and limbs of the plant which are not treated by the streams direct from the nozzle 18.

In view of the foregoing it is to be particularly understood that the streams from the nozzle contact with the upper surface of the foliage and limbs of the plant while the strips or flaps 21 treat the under surfaces so that it is assured that a plant with the use of my improved apparatus will have thoroughly and effectively applied thereto the liquid from within the receptacle or tank R.

As is particularly illustrated in Figure 3 it is to be noted that the rearwardly convergence of the side walls 15 of a hood provides a relatively broad front or entrance opening to the hood H. This is of particular advantage because, as a plant is received within the hood, the hood upon its continued travel compacts the foliage of the plant which is a further assurance of effective treatment.

To further maintain the structure or frame F in applied or working position I find it of advantage to employ the brace rods 22. Each of these brace rods 22 has one extremity secured to an end portion of the intermediate member 23 of the frame F and its opposite end portions secured to a cross bar or strip 24 connecting the handle members 25, said handle members 25 being of a conventional type and operatively engaged with the rear portion of the portable body. As indicated in Figures 1 and 4, these reinforced rods 22 are disposed rearwardly in convergence with the converging ends connected, said connected extremity being secured as at 26 to the central portion of the strip 24.

While each of the openings 19 is of a size to permit visual access to the nozzle 18 it is to be understood that the liquid will not discharge upwardly through said openings 19 as the spraying of the liquid occurs at a point rearwardly of the openings 19.

From the foregoing description it is thought to be obvious that a spraying apparatus constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:

1. A spraying apparatus comprising a hood consisting of a top and sides, said top being disposed on a downward and rearward incline, and a spraying medium supported by and underlying the top, said top being flexible on lines lengthwise thereof.

2. A spraying device comprising a hood consisting of a top and sides, the opposite ends of the hood being open, cleats secured to the rear portions of the sides and top of the hood, the rear faces of the cleats being beveled, and elongated strips of absorbent material attached to the beveled faces of the cleats, said strips normally providing a closure for the exit end of the hood.

3. A spraying apparatus comprising a portable body, a vertically disposed arm carried by the body, an elongated rod substantially perpendicularly related to the arm, means for slidably connecting an extremity of the rod to the arm, means for holding the rod against sliding movement along the arm, a member slidably supported upon the rod, means for holding said member against sliding movement on the rod, a head supported by said member and hood arranged below the head, and means for flexibly connecting the hood and head.

4. A spraying apparatus comprising a hood consisting of a top and sides, the opposite ends of the hood being open, cleats secured to the rear portions of the sides and top of the hood, and elongated strips of absorbent material attached to the cleats, said strips being attached in groups, respectively, to each of the side cleats and to the top cleat, and normally providing a closure for the exit end of the hood.

5. A spraying apparatus comprising a hood consisting of a top and sides, said top being flexible on lines lengthwise thereof, a spraying medium supported by and underlying the top, and reinforcing members secured to the side walls and the top.

In testimony whereof I hereunto affix my signature.

JAMES H. WALKER, Jr.